(12) United States Patent
Perrotin et al.

(10) Patent No.: US 11,009,083 B2
(45) Date of Patent: May 18, 2021

(54) SELF CENTRING SLEEVE FOR A DEVICE WITH CLUTCH RELEASE/ENGAGEMENT THRUST BEARING, DEVICE EQUIPPED WITH SUCH A SLEEVE, AND MOTOR VEHICLE EQUIPPED WITH SUCH A DEVICE

(71) Applicant: Aktiebolaget SKF, Gothenburg (SE)

(72) Inventors: Thomas Perrotin, Saint Roch (FR); Mickael Chollet, Joué-lès-Tours (FR); Joaquim Pinho, Saint Pierre des Corps (FR)

(73) Assignee: Aktiebolaget SKF, Gothenburg (SE)

( * ) Notice: Subject to any disclaimer, the term of this patent is extended or adjusted under 35 U.S.C. 154(b) by 54 days.

(21) Appl. No.: 16/420,610

(22) Filed: May 23, 2019

(65) Prior Publication Data

US 2019/0383333 A1   Dec. 19, 2019

(30) Foreign Application Priority Data

Jun. 14, 2018   (FR) ...................................... 1855212

(51) Int. Cl.
   *F16D 23/14*       (2006.01)
(52) U.S. Cl.
   CPC .......... *F16D 23/14* (2013.01); *F16C 2361/43* (2013.01)
(58) Field of Classification Search
   CPC .... F16D 23/14; F16D 23/148; F16C 2361/43; F16C 33/58
   See application file for complete search history.

(56) References Cited

U.S. PATENT DOCUMENTS

| 4,026,398 A | * | 5/1977 | Matyschik | .............. F16D 23/14 |
| | | | | 192/98 |
| 4,080,019 A | | 3/1978 | Flaissier | |
| 4,142,618 A | | 3/1979 | Fontaine | |

(Continued)

FOREIGN PATENT DOCUMENTS

| FR | 2320460 A1 | 3/1977 |
| FR | 2414148 A1 | 8/1979 |

(Continued)

OTHER PUBLICATIONS

FR2660034A1 (Valeo, J Feigler)—Sep. 27, 1991.*

*Primary Examiner* — Tinh Dang
(74) *Attorney, Agent, or Firm* — Garcia-Zamor Intellectual Property Law; Ruy Garcia-Zamor; Bryan Peckjian

(57) ABSTRACT

A sleeve for a clutch release/engagement thrust bearing device. The sleeve provides a body with a first axial bearing surface configured to work together with a translationally mobile control member, a second axial bearing surface configured to interact with a non-rotating ring of a bearing, and a central bore around a central axis configured to accept a cylindrical guide. The central bore of the sleeve provides a first series of guide portions with cylindrical surfaces, a second series of guide portions with cylindrical surfaces, which are axially at the opposite end to the first series. The guide portions of the first series are offset with respect to the guide portions of the second series in the circumferential direction, and an intermediate bore portion that is recessed with respect to the guide portions. The intermediate bore portion extending axially between the first and second series of the guide portions.

8 Claims, 3 Drawing Sheets

(56) References Cited

U.S. PATENT DOCUMENTS

| | | | | |
|---|---|---|---|---|
| 4,228,881 A | * | 10/1980 | Nakamura | F16D 23/14 |
| | | | | 192/98 |
| 5,993,067 A | * | 11/1999 | Giese | F16C 19/163 |
| | | | | 384/450 |
| 9,677,616 B2 | * | 6/2017 | Arnault | F16D 23/14 |

FOREIGN PATENT DOCUMENTS

| | | | | | |
|---|---|---|---|---|---|
| FR | | 2486182 A1 | | 1/1982 | |
| FR | | 2547002 A1 | | 12/1984 | |
| FR | | 2660034 A1 | | 9/1991 | |
| FR | | 2660034 A1 | * | 10/1991 | F16D 23/14 |

\* cited by examiner

[Fig. 1]
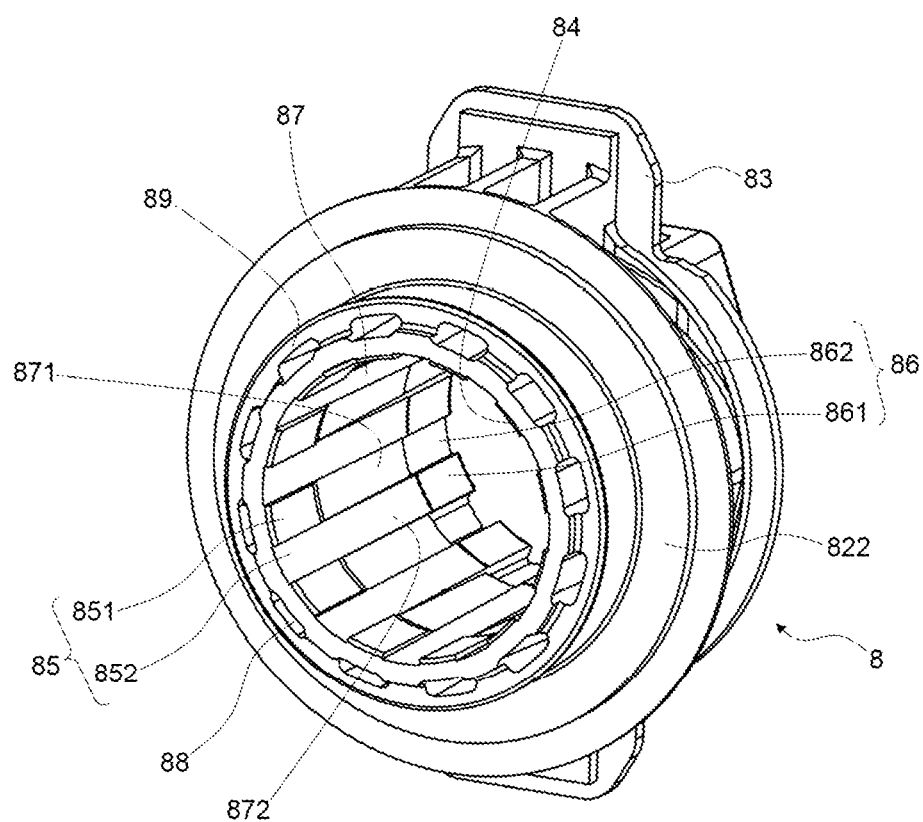

[Fig. 2]
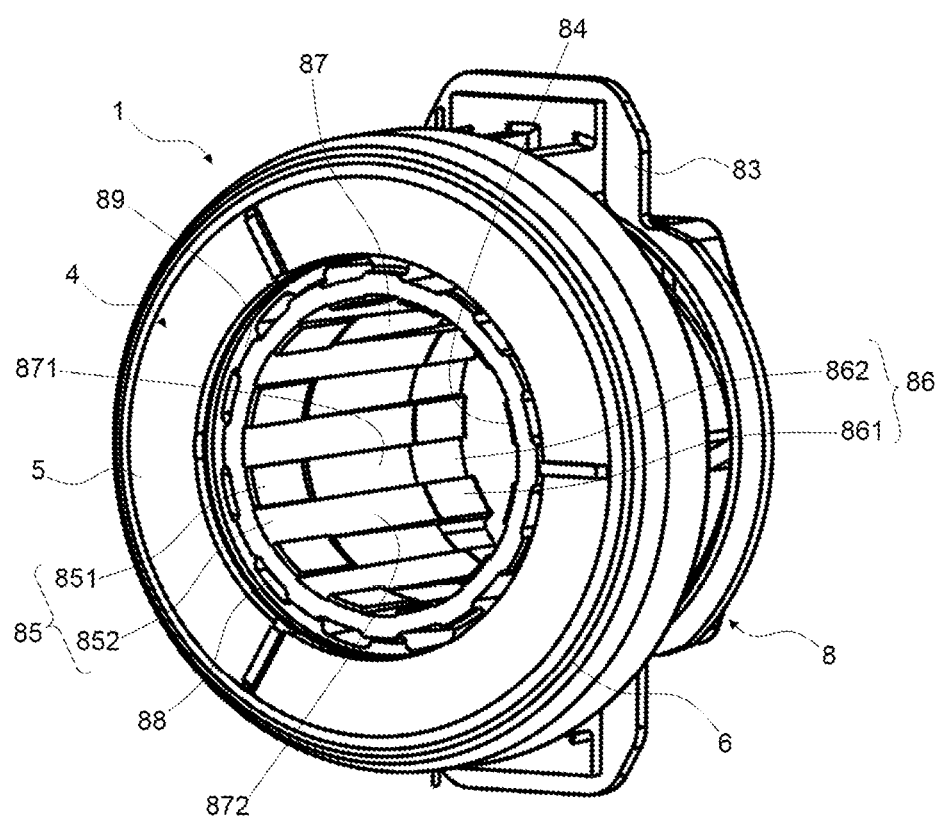

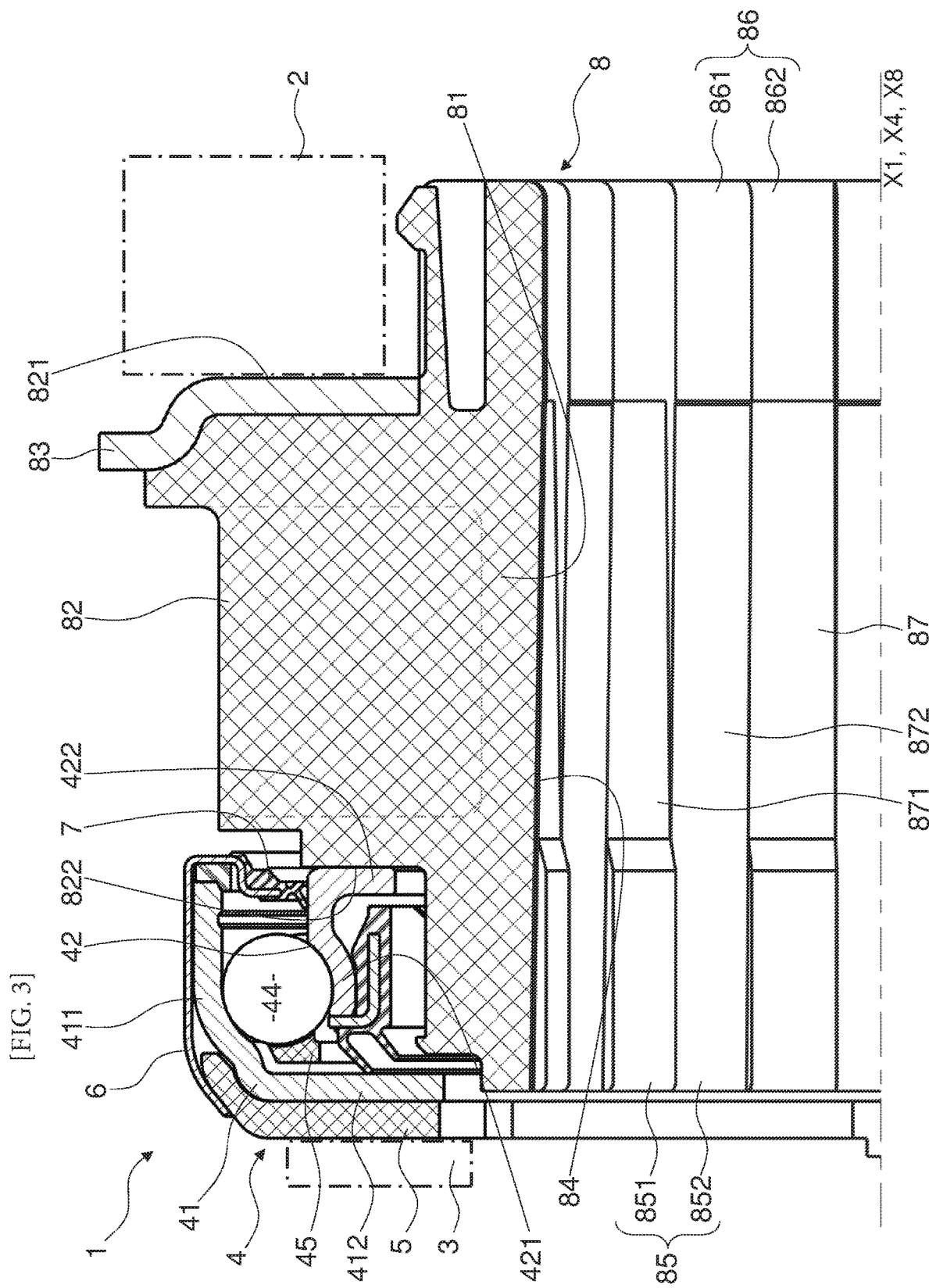
[FIG. 3]

SELF CENTRING SLEEVE FOR A DEVICE WITH CLUTCH RELEASE/ENGAGEMENT THRUST BEARING, DEVICE EQUIPPED WITH SUCH A SLEEVE, AND MOTOR VEHICLE EQUIPPED WITH SUCH A DEVICE

CROSS-REFERENCE

This application claims priority to French patent application no. 1855212 filed on Jun. 14, 2018, the contents of which are fully incorporated herein by reference.

TECHNOLOGICAL FIELD

The present invention relates to the field of clutch release/engagement thrust bearing devices used in motor vehicles and intended to act on the diaphragm of such a clutch, and more particularly self centring sleeves for such devices.

BACKGROUND

In the automotive field, it is known practice to use a clutch-release/engagement thrust bearing mounted on a sleeve actuated by a translationally mobile (mechanical, electrical or hydraulic) control member to engage a manual or automatic gearbox.

In order to do this, the clutch-release/engagement thrust bearing device comprises a bearing with rolling elements housed between a rotating ring a non-rotating ring securely mounted on a self centring sleeve pushed by the translationally mobile control member. The control member may consist of a two-finger fork, a transverse fork, or any other known type of member for such an application. The sleeve is provided with a central bore mounted on a cylindrical guide.

On the opposite side, the device comprises an actuating member incorporated into a clutch intended to be actuated axially by the rotating ring of the bearing, the actuating member then acting on rotating mechanical elements to allow the transmission of torque and the operation of the gearbox. The actuating member may consist of a spring finger diaphragm, of pressure plates, or any other known type of actuating member.

The sleeve is a component generally made of plastic or polymer, by a molding method using a steel mold. However, it is a particularly complex matter to ensure the geometric precision of the central bore. The demolding step of the method is difficult to master and may give rise to a variation in the inside diameter of the central bore. Thermal shrinkage of the plastic or polymer material also needs to be finely controlled in order to limit the variations in thickness of the material and therefore ensure that the dimensional tolerances on the central bore are met.

SUMMARY

It is an object of the present invention to propose a novel sleeve that is simple and economical to manufacture and provides optimized guidance.

To this end, the invention relates to a sleeve for a clutch release/engagement thrust bearing device comprising a body with a first axial bearing surface intended to to work together with a translationally mobile control member, a second axial bearing surface intended to to work together with a non-rotating ring of a bearing, and a central bore around a central axis intended to accept a cylindrical guide.

According to the invention, the central bore of the sleeve comprises a first series of guide portions with cylindrical surfaces. The portions of the first series are all of the same first diameter, are separated from one another by larger diameter recessed zones, are evenly circumferentially spaced from one another, and extend axially along a first axial length from a first axial end of the central bore of the sleeve.

The central bore of the sleeve comprises a second series of guide portions with cylindrical surfaces which is axially at the opposite end to the first series. The portions of the second series are all of the same second diameter equal to the first diameter, are separated from one another by larger diameter recessed zones, are evenly circumferentially spaced from one another and extend axially along a second axial length from a second axial end of the central bore of the sleeve.

The guide portions of the first series are offset with respect to the guide portions of the second series in the circumferential direction, a guide portion of one series being axially opposite a recessed zone between two guide portions of the other series.

The central bore of the sleeve finally comprises an intermediate bore portion that is recessed with respect to the guide portions, the intermediate bore portion extending axially between the first and second series of the guide portions.

By virtue of the invention, a self centring sleeve provides the transmission of load from a translationally mobile control member to a rolling bearing via two axial bearing surfaces. The sleeve is guided axially by a guide housed in the central bore of the sleeve, supported by the guide portions of the first and second series.

The guide portions are provided at each axial end of the central bore of the sleeve and suffice for optimized guidance of the guide.

The intermediate bore portion and the zones between the guide portions are recessed with respect to the guide portions. This may allow any contamination, such as dust, particles, water, to pass between the exterior surface of the guide and the sleeve. In addition, the intermediate bore portion may act as a reservoir of lubricant in order to optimize the relative axial movement of the guide in the sleeve.

According to advantageous but non-compulsory aspects of the invention, such a sleeve may incorporate one or more of the following features considered in any technical permissible combination:

The first and second axial lengths of the bore portions of the first and second series respectively, are equal.

The guide portions of at least one of the series at one end of the central bore of the sleeve are each extended by a recessed ramp of larger diameter than the portion and having an interior surface that slopes axially towards the other end of the central bore.

The body of the sleeve is provided with at least one series of cavities extending axially from a lateral surface of the sleeve, each of these cavities radially facing a larger diameter of a guide portion of one of the series of guide portions.

The cavities of one series are arranged in a circle centered on the central axis of the central bore of the sleeve.

The sleeve is made of polymer or plastic material.

The sleeve is made of polyamide, for example of PA46.

The polyamide of the sleeve is filled with molybdenum disulfide (MoS2).

The sleeve comprises a backplate secured to the body and forming an axial bearing surface intended to to work together with a translationally mobile control member.

The backplate is made of metal, for example of steel.

Another subject of the invention is a motor vehicle clutch release/engagement thrust bearing device, this device comprising a bearing forming an axial load transmitting member, with a rotating ring and a non-rotating ring between which rings a raceway chamber for rolling elements is defined, and a sleeve according to any one of the above embodiments on which the non-rotating ring is securely mounted.

The invention also relates to a motor vehicle equipped with a device as mentioned hereinabove, for engaging/disengaging its gearbox.

BRIEF DESCRIPTION OF THE DRAWINGS

The invention will be better understood, and further advantages thereof will become more clearly apparent in the light of the following description of one embodiment in accordance with the principle thereof, given solely by way of example and made with reference to the attached drawings, in which:

FIG. 1 is a perspective view of a sleeve for a clutch-release/engagement thrust bearing device according to one embodiment of the invention.

FIG. 2 is a perspective view of a clutch-release/engagement thrust bearing device provided with a bearing and with the sleeve of FIG. 1.

FIG. 3 is a half axial section of the clutch-release/engagement thrust bearing device of FIG. 2.

DETAILED DESCRIPTION

A clutch release/engagement thrust bearing device 1 depicted in FIGS. 2 and 3 is intended to be mounted on a motor vehicle to transmit axial load applied by a translationally mobile member 2, depicted in chain line in FIG. 3 only, to an actuating member 3, for example a spring finger diaphragm, likewise depicted in chain line in FIG. 3 only. The central axis of the clutch-release/engagement thrust bearing device 1 is denoted X1.

The device 1 comprises a ball bearing 4 comprising a rotating outer ring 41 and a non-rotating inner ring 42 between which a raceway chamber is defined. A single row of rolling elements 44, in this instance balls, is arranged in the raceway chamber, being held in position by a cage 45.

The outer ring 41 and inner ring 42 are made from pressed sheet metal.

The central axis of the rolling bearing 4, namely the axis of relative rotation of the rings 41 and 42 with respect to one another, is denoted X4. In the normal mode of operation of the device 1, the axes X1 and X4 are coincident.

The outer ring 41 comprises an axial tubular portion 411 the surface of the interior side of which defines a concave surface acting as a raceway for the balls 44. The tubular portion 411 extends radially towards the inside of the rolling bearing 4 via a radial portion 412 substantially perpendicular to the axis X4, the internal radial edge of which defines a bore O41.

The outer ring 41 is advantageously provided with a wearing ring 5 mounted on the radial portion 412. The wearing ring 5 is advantageously secured to the outer ring 41 by means of a retaining shield 6. The actuating member 3 comes to bear against this wearing ring 5 so as to receive axial load from the translationally mobile member 2. As an alternative, the actuating member may bear directly against the radial portion 412.

The shield 6 comprises a radial portion directed towards the inside of the bearing 4, towards the rolling elements 44 but without coming into contact therewith and is provided with a seal 7. The seal is advantageously made of a polymer material and is overmolded on the shield 6. The seal 7 comprises two lips that come into sliding contact with the inner ring 42 of the bearing 4. Such a shield 6 holds the rolling bearing 4 together if the rings 41, 42 of the rolling bearing 4 separate or in the event of excessive swiveling. The seal 7 seals the raceway chamber against the intrusion of contamination. Alternatively, the shield 6 is not provided with a seal and comes into the immediate vicinity of the inner ring 42 to form a labyrinth seal.

The inner ring 42 comprises an axial tubular portion 421 the surface of the exterior side of which defines a concave surface acting as a raceway for the balls 44. The tubular portion 421 extends radially towards the inside of the rolling bearing 4 via a radial portion 422 substantially perpendicular to the axis X4, the internal radial edge of which defines a bore.

A self-aligning or self centring sleeve 8 comes to bear against this radial portion 422 in such a way as to transmit axial load to the actuating member 3.

The sleeve 8 illustrated in FIGS. 1 to 3 comprises an annular body 81 mounted in the bore of the inner ring 42 of the bearing 4. The body 81 is provided with a portion 82 projecting axially towards the outside of the sleeve 8 and forming a first axial bearing surface 821 collaborating with the translationally mobile control member 2, and a second axial bearing surface 822 collaborating with the radial portion 422 of the non-rotating inner ring 42 of the bearing 4.

Advantageously, the body 81 of the sleeve 8 is provided with a backplate 83 made of steel and forming the first axial bearing surface 821 collaborating with the translationally mobile control member 2. As an alternative, the translationally mobile member 2 may come to bear directly against the projecting portion 82 of the body 81.

The body 81 of the sleeve 8 is also provided with a central bore 84 around a central axis X8 intended to accept a cylindrical guide (not illustrated). In the normal mode of operation of the device 1, the axes X1 and X8 are coincident.

The sleeve 8 is advantageously made of a polymer or plastic material, notably a polyamide, and in particular of PA46. The polyamide may advantageously be filled with molybdenum disulfide (MoS2) forming a solid lubricant to facilitate and reduce heating during the sliding of the guide in the central bore. The backplate 83 may advantageously be integrated by overmolding in the projecting portion 82 of the body 81 of the sleeve 8. This results in excellent cohesion between the two components. Cavities may advantageously be provided in the backplate 83 and into which the molded plastic or polymer material penetrates to form stacks by complementary shapes.

According to the invention, the central bore 84 of the sleeve 8 comprises a first series 85 of guide portions 851, a second series 86 of guide portions 861 and an intermediate bore portion 87.

The portions 851 of the first series 85 all have cylindrical surfaces of the same inside diameter centered on the central axis X8. The portions 851 are separated from one another by larger diameter recessed zones 852. The portions 851 are evenly circumferentially spaced from one another to form a regular alternation of recessed zones 852 and of guide portions 851 in the circumferential direction. Finally, these portions 851 extend axially over a certain axial length from a first axial end of the central bore 84.

The portions 861 of the second series 86 are axially at the opposite end to the portions 851 of the first series 85. The portions 861 of the second series 86 all have cylindrical surfaces of the one same inside diameter centered on the central axis X8. These portions 851, 861 of the first and second series 85, 86 all have the same inside diameter. The portions 861 of the second series 86 are separated from one another by larger diameter recessed zones 862. The portions 861 are evenly circumferentially spaced from one another to form a regular alternation of recessed zones 862 and of guide portions 861 in the circumferential direction. Finally, these portions 861 extend axially over a certain axial length from a second axial end of the central bore 84 and at the opposite end to the first end. In the example illustrated in FIGS. 1 to 3, the portions 851, 861 extend over the one same axial length. Alternatively, the portions of the two series may extend over two different lengths.

The guide portions 851, 861 of the two series 85, 86 are axially opposite each other and serve to center, align and guide the translation of the guide at each axial end of the central bore 84 of the sleeve 8.

In addition, the guide portions 851 of the first series 85 are offset with respect to the guide portions 861 of the second series 86 in the circumferential direction. A guide portion 851 of the first series 85 is axially opposite a recessed zone 862 between two guide portions 861 of the other series 86 and, conversely, the guide portion 861 of the second series 86 is axially opposite a recessed zone 852 between two guide portions 851 of the other series 85. In the example illustrated, the alternating guide portions 851, 861 and recessed zones 852, 862 of the two series 85, 86 have the same angular extension in the circumferential direction, the offset between the two series 85, 86 in the circumferential direction being by one pitch defined as being the common angular extension of these portions 851, 852, 861, 862.

By virtue of such an alternation, it is possible to provide a steel mold in two parts which are assembled to form such a bore 84. Specifically, a first part of the mold may comprise a plurality of axial tongues uniformly distributed in the circumferential direction, the tongues each being provided at their end with a dedicated cylindrical exterior surface to form a guide portion 851. A second part of the mold may comprise a plurality of axial tongues uniformly distributed in the circumferential direction, the tongues being provided at each of their ends with a dedicated cylindrical exterior surface to form a guide portion 861. The two mold parts can be fitted together axially once they have been offset in the circumferential direction so as to form a complete mold for the bore 84 of the sleeve 8. Once molding has been performed, it is then easy to extract each of the molds in opposing axial directions using a translational movement alone.

The central bore 84 of the sleeve finally comprises an intermediate bore portion 87 which is recessed with respect to the guide portions 851, 861. The intermediate bore portion 87 extends axially between the first and second series 85, 86 of the guide portions.

The recessed zones 852, 862 and the intermediate bore portion 87 are zones which are not functional in the guidance of the guide. These zones therefore require lower manufacturing precision. In particular, the intermediate bore zone 87, of greater length, and which is therefore more difficult to control during the method of manufacture using molding, does not require a precise tolerance because the functional guide zones are provided by the portions 851, 861 at the axial ends of the central bore 84. In addition, these zones 852, 862 may prove beneficial to the device 1 in operation, notably to allow contamination, such as dust, particles, water, to pass between the exterior surface of the guide and the sleeve 8. In addition, the intermediate bore portion 87 may act as a lubricant reservoir so as to optimize the relative axial movement of the guide in the sleeve 8.

Furthermore, the guide portions 851, 861 at each end are functional zones for the guidance of the guide and require a high dimensional tolerance in manufacture in order to ensure the reliability of the device 1. By virtue of the invention, these guide portions 851, 861 extend angularly and axially over reduced areas in comparison with the total axial length of the central bore 84. Thus, it is simpler to achieve effective control over the method for molding smaller areas, notably during extraction from the molds. A sleeve 8 provided with a bore with a plurality of guide portions 851, 861 of small dimensions thus allows better control over dimensional tolerances and therefore improved reliability of the guidance function of the sleeve 8.

Advantageously, the guide portions 851 of the first series 85 at the first end of the central bore 84 of the sleeve 8 are each extended by a recessed ramp 871 of a larger diameter than the portion. The ramps 871 extending from the portions 851 are each provided with an interior surface sloping axially towards the other end of the central bore 84. Similarly, and in an axially opposed manner, the guide portions 861 of the second series 86 at the second end of the central bore 84 of the sleeve 8 are each extended by a recessed ramp 872 of larger diameter than the portion. The ramps 872 extending from the portions 861 are each provided with an interior surface sloping axially towards the other end of the central bore 84.

In the example illustrated, the ramps 872 in the axial continuation of the guide portions 861 provided at the second bore end 84 extend at a constant slope as far as the first end of the bore. The ramps 872 thus at their end form the recessed zones 852 between the guide portions 851 of the first series 85 at the first end of the bore 84. Still in the example illustrated, the ramps 871 terminate axially in larger diameter recessed zones which are a break from the slope of the ramps 871. As an alternative, the ramps 871 may also at their end form the recessed zones 862 between the guide portions 861 of the second series 86 at the second end of the bore 84.

In the embodiment illustrated, the intermediate bore portion 87 is thus formed by the central zones of the ramps 871, 872. The intermediate bore portion 87 is therefore not cylindrical of constant inside diameter but made up of a plurality of ramps inclined in opposite axial directions. The intermediate bore portion 87 remains recessed overall with respect to the cylindrical surfaces of the guide portions 851, 861 so as not to interfere with the guidance of the guide.

The ramps 871, 872 make it possible to improve the method by which the sleeve 8 is manufactured by molding, particularly the formation of the bore 84. The ramps 871, 872 are inclined in the direction of extraction of the corresponding part of the mold, so as to facilitate extraction thereof, limit any possible flash and ensure a sufficient dimensional tolerance.

Advantageously, the body 81 of the sleeve 8 is provided with a series of cavities 88 extending axially from a first lateral surface 89 of the sleeve. The first end of the central bore 84 is axially open to the first lateral surface 89. Each of these cavities 88 is open to the lateral surface 89 and extends over a certain axial length in the material of the body 81 of the sleeve. The cavities 88 are arranged in a circle centered on the central axis X8 of the central bore X84 of the sleeve 8. Each of these cavities 88 radially faces a larger diameter of a guide portion 851 of the first series 85.

Each of the cavities 89 extends over an angular sector corresponding to a guide portion 851 so that the collection of guide portions 851 of the first series 85 is associated with a cavity 89. These cavities 89 make it possible radially to ensure a constant and limited thickness of material between each cavity 89 and its corresponding guide portion 851. The fluctuations in material quantity are thus controlled and limited during the process of molding the sleeve, so as to ensure optimized quality of manufacture of these zones which are functional in the guidance of the guide.

A similar series of cavities may be provided on a second lateral surface of the sleeve axially at the opposite end to the first surface 89, these cavities being associated with the second series 86 of guide portions 861.

The invention is described hereinabove in the case of the use of a ball bearing. It can also be used with other rolling elements, notably rollers or needles.

The technical features of the embodiments and alternative forms envisaged hereinabove may be combined with one another.

What is claimed is:

1. A sleeve for a clutch release/engagement thrust bearing device comprising:
    a body with a first axial bearing surface configured to work together with a translationally mobile control member,
    a second axial bearing surface configured to work together with a non-rotating ring of a bearing, and
    a central bore around a central axis intended to accept a cylindrical guide, wherein the central bore of the sleeve further comprises:
    a first series of guide portions with cylindrical surfaces and with a first same diameter, separated from one another by larger diameter recessed zones, evenly circumferentially spaced from one another, and extending axially along a first axial length from a first axial end of the central bore of the sleeve,
    a second series of guide portions with cylindrical surfaces and a second same diameter equal to the first diameter, which is axially at the opposite end to the first series, the portions being separated from one another by larger diameter recessed zones, evenly circumferentially spaced from one another and extending axially along a second axial length from a second axial end of the central bore of the sleeve, the guide portions of the first series being offset with respect to the guide portions of the second series in the circumferential direction, a guide portion of one series being axially opposite a recessed zone between two guide portions of the other series, and
    an intermediate bore portion that is recessed with respect to the guide portions, the intermediate bore portion extending axially between the first and second series of the guide portions.

2. The sleeve according to claim 1, wherein the guide portions of at least one of the series at one end of the central bore of the sleeve are each extended by a recessed ramp of larger diameter than the portion and having an interior surface that slopes axially towards the other end of the central bore.

3. The sleeve according to claim 1, wherein the body of the sleeve is provided with at least one series of cavities extending axially from a lateral surface of the sleeve, each of the cavities radially facing a larger diameter of a guide portion of one of the series of guide portions.

4. The sleeve according to claim 3, wherein the cavities of one series are arranged in a circle centered on the central axis of the central bore of the sleeve.

5. The sleeve according to claim 1, wherein the sleeve is made of a polyamide filled with molybdenum disulfide (MoS2).

6. The sleeve according to claim 1, wherein the sleeve comprises a backplate secured to the body and forming an axial bearing surface configured to work together with a translationally mobile control member.

7. A motor vehicle clutch release/engagement thrust bearing device, comprising:
    a bearing forming an axial load transmitting member, with a rotating ring and a non-rotating ring, and a raceway disposed therebetween the inner ring and outer ring, the raceway providing a chamber for rolling elements, and a sleeve according to claim 1 on which the non-rotating ring is securely mounted.

8. A motor vehicle equipped with a device according to claim 7 for engaging/disengaging its gearbox.

\* \* \* \* \*